UNITED STATES PATENT OFFICE.

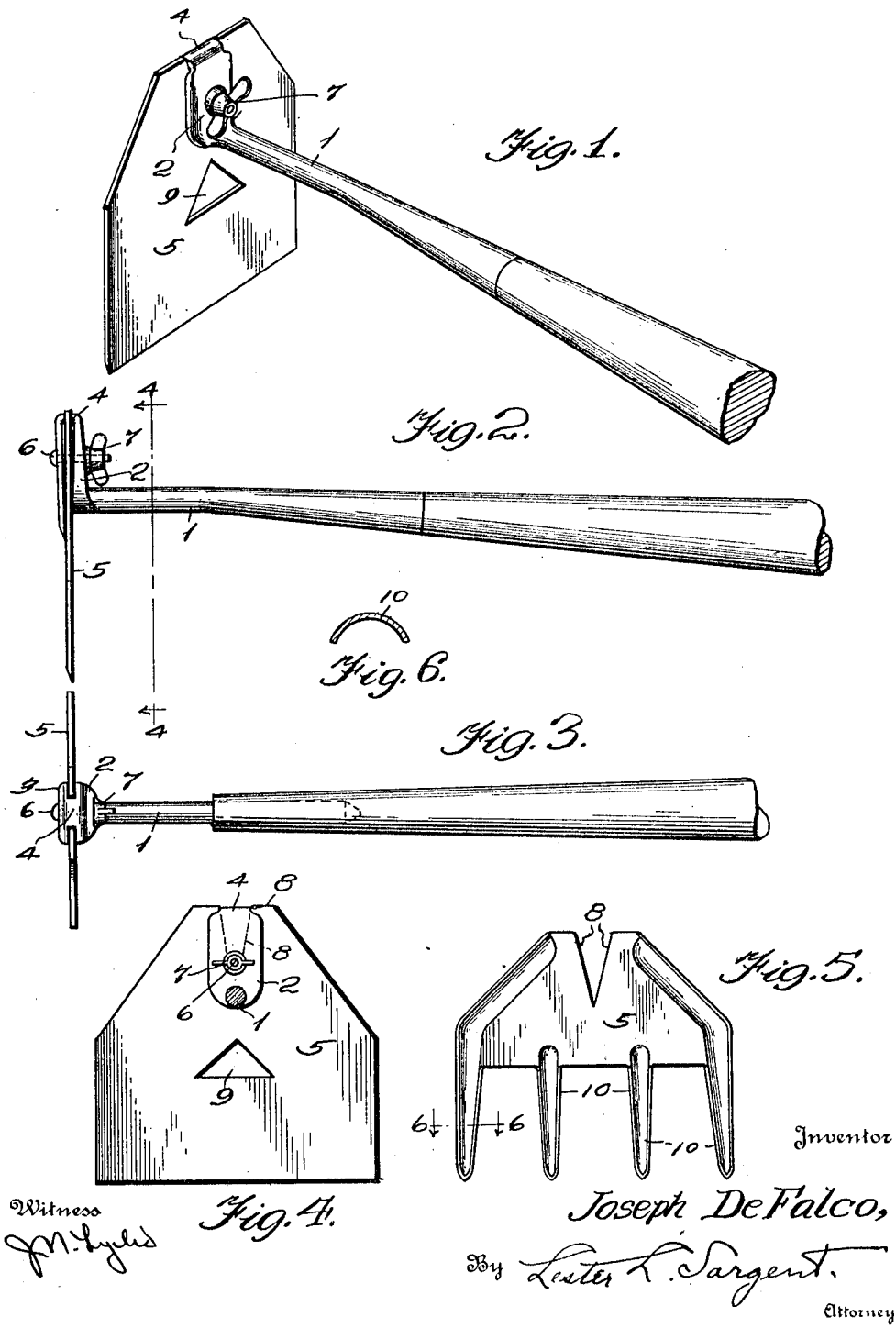

JOSEPH DE FALCO, OF VINELAND, NEW JERSEY.

INTERCHANGEABLE GARDEN-TOOL.

1,273,464.  Specification of Letters Patent.  Patented July 23, 1918.

Application filed October 6, 1917. Serial No. 195,097.

*To all whom it may concern:*

Be it known that I, JOSEPH DE FALCO, a citizen of the United States, residing at Vineland, in the county of Cumberland and State of New Jersey, have invented a new and useful Interchangeable Garden-Tool, of which the following is a specification.

The object of my invention is to provide an interchangeable garden tool of novel construction, and particularly to provide such improved means for securing and releasing interchangeable tool members to the handle member that the tools can be interchanged in a few seconds, and without the necessity of removing a plurality of screws or any portion of the tool holding elements. It is further my object to provide a tool holder of novel shape and which is more advantageous in operation than previous devices of this class, and which will not interfere with the operation of the hoe. It is further my object to provide the novel arrangement and construction of parts as shown in the accompanying drawings, in which—

Figure 1 is a perspective of my device with hoe blade attached;

Fig. 2 is a side elevation;

Fig. 3 is a top plan, showing a modified form of member 1;

Fig. 4 is a section on line 4—4 of Fig. 2;

Fig. 5 is a detail of my interchangeable weeder or digger tool; and Fig. 6 is a section of a tooth, on line 6—6 of Fig. 5.

Referring to the accompanying drawings, I provide a suitable tool holder 1, as illustrated in the drawings, and which may be either secured over a suitable wooden handle or inserted in the handle. Tool holder 1 is provided with an upwardly extending clamp member 2, a downwardly extending clamp member 3, and a suitable spring neck 4 connecting the members 2 and 3. Clamp member 3 in released position springs slightly apart from member 2 so as to release any tool instantly. Both members 2 and 3 are positioned at approximately right angles to the tool holder 1. Releasably secured in the clamping device formed by members 2, 3 and 4 is any suitable tool 5, which is provided with a V-shaped opening 8 to permit of its convenient insertion in the clamping device. I provide a suitable bolt 6 extending through members 2 and 3, and I further provide a suitable winged nut 7 by which members 2 and 3 may be readily and quickly brought to or released from clamping engagement with tool 5. I may provide any suitable interchangeable tool in connection with my tool holder, such for example as a hoe blade, a digger or weeder, or a rake, such as illustrated in the accompanying drawings. I prefer to provide the novel concavo-convex teeth 10 for tools having teeth, since this construction increases the strength of the tool without interfering with the manufacture of the tool by a stamping process. It is within my contemplation to suitably reinforce in a similar manner hoe and like blades. I prefer to provide the novel form of hoe blade illustrated having a triangular opening 9, to allow some of the earth to escape therethrough and thus make the tool easier to use, when my invention is being used as a hoe.

In operation it is only necessary to release the winged nut 7 slightly to permit the downwardly extending clamp member 3 to spring out sufficiently to release one tool and permit of the insertion of a different tool. The primary purpose of my invention is to provide such a combination of parts as to permit a quick interchange of different tools, without the loss of time required in taking out ordinary screws, as in certain prior devices in this art. By providing the disposition of clamp members 2 and 3 on a plane above holder 1, the main portion of the tool holder and the bolt are clear of any obstructions which would tend to collect dirt and interfere with the convenient use of the implement.

I am aware that various interchangeable tools have heretofore been devised, but believe my invention to constitute a substantial improvement over them for the reasons above set forth and hereinafter claimed.

What I claim is:

1. In a device employing a series of interchangeable tools, the combination of a tool holder, a U-shaped clamp in which the tool holder terminates said clamp being disposed above the main portion of the tool holder, the clamp member having a narrowed spring neck portion, manually adjustable means for clamping the device to a tool, and a tool having a V-shaped slotted portion into which the narrowed neck of the clamp member is insertible, substantially as described.

2. In a device employing a series of interchangeable tools, the combination of a tool holder, a U-shaped resilient clamp member having substantially its entire portion positioned above the tool holder and having a narrowed neck portion, a thumb nut adjusting device mounted in the clamp member, the outer portion of the clamp member being normally sprung apart from the inner portion, and a garden tool member having a V-shaped slotted portion to receive the neck of the clamp member substantially as set forth.

JOSEPH DE FALCO.

Copies of this patent may be obtained for five cents each, by addressing the "Commissioner of Patents, Washington, D. C."